(12) United States Patent
Xie

(10) Patent No.: US 6,303,710 B1
(45) Date of Patent: Oct. 16, 2001

(54) CONTROL OF OLEFIN POLYMERIZATION USING HYDROGEN

(75) Inventor: Tuyu Xie, Kingston (CA)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/492,579

(22) Filed: Jan. 27, 2000

Related U.S. Application Data

(60) Provisional application No. 60/117,464, filed on Jan. 27, 1999.

(51) Int. Cl.[7] ............................. C08F 2/34; C08F 2/42; C08F 4/60; C08F 4/70; C08F 4/80
(52) U.S. Cl. ............................. 526/65; 526/82; 526/90; 526/161; 526/169; 526/169.1; 526/172; 526/901; 526/905
(58) Field of Search ............................. 526/90, 161, 169, 526/169.1, 172, 901, 905, 82, 65

(56) References Cited

U.S. PATENT DOCUMENTS 5,714,556   2/1998   Johnson et al. ............... 526/135

FOREIGN PATENT DOCUMENTS

| 197 07 236 A1 | 8/1998 | (DE) | C08F/4/625 |
| 0 009 160 A1 | 4/1980 | (EP) | C08F/10/00 |
| 522635 A1 * | 1/1993 | (EP) | . |
| 570051 A1 * | 11/1993 | (EP) | . |
| 0 570 051 A1 | 11/1993 | (EP) | C08F/10/02 |
| 0 580 930 A1 | 11/1993 | (EP) | C08F/10/02 |
| 580930 A1 * | 2/1994 | (EP) | . |
| 0 874 005 A1 | 10/1998 | (EP) | C08F/10/00 |
| 1 434 264 | 5/1976 | (GB) | C08F/10/00 |
| WO 96/23010 | 8/1996 | (WO) | C08F/210/16 |
| WO 98/03559 | 1/1998 | (WO) | C08F/4/70 |
| WO 98/30609 | 7/1998 | (WO) | C08F/10/00 |
| WO 98/30610 | 7/1998 | (WO) | C08F/10/00 |
| WO 98/40374 | 9/1998 | (WO) | C07D/319/02 |
| WO 98/40420 | 9/1998 | (WO) | C08F/10/00 |
| WO 98/47933 | 10/1998 | (WO) | C08F/10/00 |
| WO 98/47934 | 10/1998 | (WO) | C08F/10/00 |
| WO 99/61492 | 12/1999 | (WO) | C08F/10/00 |
| WO 99/62963 | 12/1999 | (WO) | C08F/4/70 |

OTHER PUBLICATIONS

Copy of International Search Report (PCT/US00/02095) dated May 30, 2000.

* cited by examiner

*Primary Examiner*—David W. Wu
*Assistant Examiner*—R. Rabago

(57) ABSTRACT

The polymerization rate of olefins polymerizations using late transition metal catalysts which are coordinated to various ligands may be controlled by the amount of hydrogen present in the polymerization. The effect of hydrogen on polymerization rate is reversible.

10 Claims, 3 Drawing Sheets

CONTROL OF OLEFIN POLYMERIZATION USING HYDROGEN

This application claims priority under 35 U.S.C. §119 from U.S. Provisional Application Ser. No. 60/117,464 (filed Jan. 27, 1999), which is incorporated by reference herein as if fully set forth.

FIELD OF THE INVENTION

Olefin polymerizations using late transition metal catalysts can be controlled using hydrogen to regulate the polymerization rate, and the effect on polymerization rate is reversible when the hydrogen is removed.

TECHNICAL BACKGROUND

Polymerizations of olefins using late transition metal catalysts, that is metals of Groups 6 through 10 (new IUPAC notation) such as Fe, Co, Ni, and Pd have been of interest lately, see for instance World Patent Applications 96/23010, 98/03559, 98/30610, 98/30609, 98/47934, 98/47933, 98/40420 and 98/40374, and U. S. Pat. No. 5,714,556. Catalysts such these are of great interest because besides making known commercial polymers such as high and low density polyethylenes, they are also capable of making polyolefins with new structures.

It is known that hydrogen can be used to lower by chain transfer the molecular weight of polymers produced with many of these catalysts, see World Patent Applications 99/61492 and 99/62963. However, in many instances a relatively large amount of hydrogen is required to get a desired lowering of polyolefin molecular weight.

It is also known that initial (at the start of a polymerization) olefin polymerization rates with these catalysts may be very high resulting in a tendency to overheat the polymerization in its initial stages. This often is undesirable, since it may adversely affect the morphology and/or structure of the polyolefin formed, and/or may reduce the overall productivity of the polymerization catalyst. It may also be desirable to slow the polymerization temporarily when changing polymerization conditions such as pressure and/or temperature, so as to avoid making "transition" material. Therefore a method for controlling olefin polymerization rates with these catalysts without significantly affecting later polymerization and/or the overall catalyst productivity is desired.

SUMMARY OF THE INVENTION

The invention concerns an improved process for the polymerization of olefins using as part of a polymerization catalyst a coordination compound containing a transition metal of Group 6 through Group 10, wherein the improvement comprises, carry out said polymerization in two or more stages at least one of which stages is a slow polymerization stage and one of which stages is a fast polymerization stage, and wherein:
  in a slow polymerization stage at least 0.1 mole percent of hydrogen, based on the amount of monomer (olefin) present, is present in said polymerization;
  in a fast polymerization stage a level of hydrogen is present that is no more than 0.8 of a level of hydrogen present in said slow polymerization stage;
  and provided that at least 5 percent by weight of a polymer produced in said process is produced in said fast polymerization stage, and at least 2 percent by weight of a polymer produced in said process is produced in said slow polymerization stage.

DETAILS OF THE INVENTION

Figure 1:
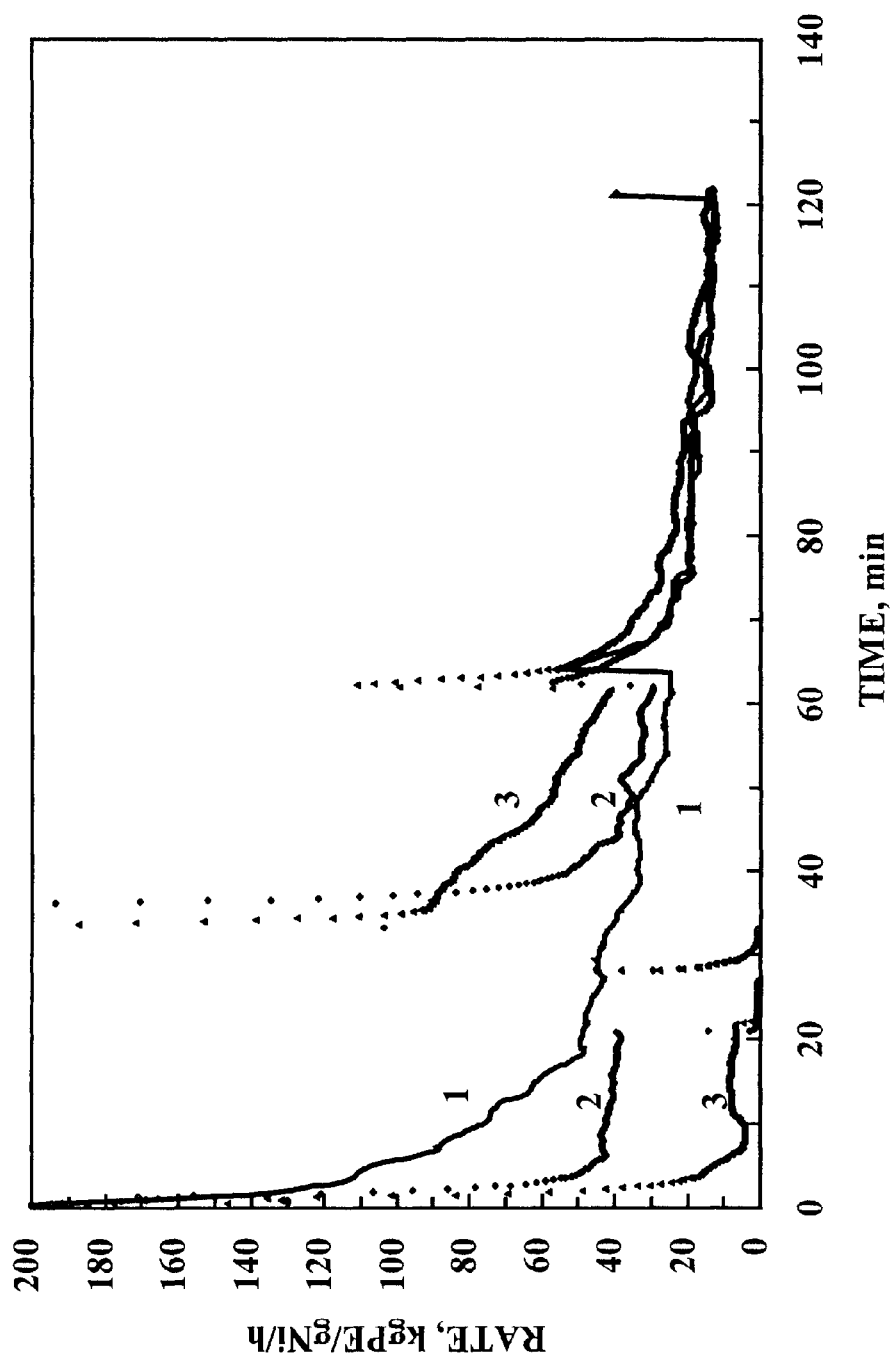
FIGS. 1, 2 and 3 show the rate of consumption of ethylene with time in various Examples, each of the curves being labeled with the appropriate Example number.

Late transition metal compounds which are useful in the polymerization catalysts used herein are known in the art see for instance World Patent Applications 96/23010, 98/03559, 98/30610, 98/30609, 98/47934, 98/30612, 98/47933, 98/40420 and 98/40374, 98/42665 and 98/42664, and U. S. Pat. No. 5,714,556, all of which are hereby included by reference.

Useful late transition metals are Co, Fe, Ni, and Pd and Ni, Fe, and Co are especially preferred, and Ni is more preferred. Preferred late transition metals are in Groups 8 through 10.

One class of preferred late transition metal compounds are nickel complexes of neutral bidentate ligands. By a neutral ligand is meant a ligand that does not have a charge on it, although it may have one or more other ligands which does have one or more (usually negative) charges. An especially preferred neutral bidentate ligand is an α-diimine of the formula (I)

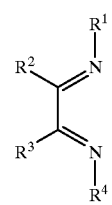

wherein $R^1$ and $R^4$ are each independently hydrocarbyl or substituted hydrocarbyl, and $R^2$ and $R^3$ are each independently hydrogen, hydrocarbyl or substituted hydrocarbyl, or $R^3$ and $R^3$ taken together may form a carbocyclic ring, as described in World Patent Application 96/23010.

By a monoanionic ligand is meant a ligand, other than a π-allyl or π-benzyl group that has a single negative charge associated with it.

Preferred olefins monomers are norbornenes and styrenes (for definitions of norbornenes and styrenes see World Patent Application 96/23010), and compounds of the formula $H_2C\!=\!CHR^5$, wherein $R^5$ is hydrogen, alkyl or substituted alkyl. Not all late transition metal catalysts will necessarily catalyze the polymerization of all of these monomers. Which type of catalyst will polymerize which type of monomer will be found in the above mentioned references. In an especially preferred olefin $R^5$ is hydrogen or n-alkyl containing 1 to 18 carbon atoms or hydrogen, and it is more preferred that $R^5$ is hydrogen (the olefin is ethylene). When ethylene is present the olefin may be just ethylene or include ethylene and one or more other olefins (i.e., "comprise ethylene").

The improved polymerizations described herein may be carried out by any olefin polymerization method described for these types of catalysts, for example in the references listed above, and in World Patent Application 98/03559. The polymerization conditions may be essentially the same, except that a certain minimum level (or more) of hydrogen is present during the slow stage, and a certain maximum (or lower), level of hydrogen is present during the fast stage. For instance the polymerization process may be carried out in solution, liquid slurry, or the gas phase. By gas phase is meant that the monomer reaches the active polymerization site while in the gas phase, although it may dissolve just as it reaches that site. Generally speaking gas phase polymerization have no substantial amount, preferably no, liquid phase present in the polymerization zone, except perhaps for liquid that may be added but which vaporizes to the gas phase (i.e., liquid monomer). Gas phase polymerization processes are preferred. One or more of the catalyst components may be dissolved in a solvent, or present as another phase in a slurry, or be supported on a solid support. The latter is preferred especially in gas phase polymerization. The polymerization may be batch, semibatch or continuous in nature. Any combination of the above may be done, as described in the above cited references.

The process consists of at least one fast polymerization stage with a lower amount of hydrogen is present (including no hydrogen), and at least one slow polymerization stage when a higher amount of hydrogen is present. There may be more than one fast polymerization stage and/or slow polymerization stage in the process. The first stage may be either a fast polymerization stage or a slow polymerization stage, but it is preferred that it is a slow polymerization stage.

By a fast polymerization stage is meant that the polymerization proceeds at a "normal" rate for that stage, i.e., the rate normally associated with no or a lowered amount of hydrogen being present. By a slow polymerization stage is meant the rate of polymerization is slowed from what it would normally be without hydrogen or a lesser amount of hydrogen present. These terms are of course relative and depend on the "inherent" catalyst activity in the various stages, as well as the polymerization conditions.

In the fast polymerization stage it is preferred that the hydrogen concentration is less than 0.05 mol percent of hydrogen based on the amount of the monomer (olefin) present. Amounts of hydrogen present may be measured by gas chromatography, using appropriate calibrations.

In the slow polymerization step it is preferred that the amount of hydrogen present is at least 0.3, more preferably about 0.5 to about 1.0 mole percent, based on the amount of the monomer present.

Changes from slow to fast polymerization stages can be accomplished by a number of means. If the monomer(s) are gaseous, the gas in the polymerization reactor may be vented and replaced by gases with lower or no hydrogen content (see the Examples). The active polymerization catalyst or catalyst sites may be transferred to another reactor with lower or no hydrogen content. Other methods will be obvious to those skilled in the art based on the present disclosure.

Changes from fast to slow polymerization stages can be accomplished in similar ways. For example, appropriate amounts of hydrogen gas may be added to the reactor to raise the hydrogen content. The active polymerization catalyst or catalytic sites may be transferred to another reactor with higher hydrogen content, or fresh monomer(s) may be added to dilute the hydrogen. Other methods will be obvious to those skilled in the art.

Changes to other polymerization conditions within the usual operating ranges of those conditions for these types of polymerizations processes may also be made when changing stages or during a particular stage. For example the temperature and/or pressure may be changed.

In the fast and slow polymerization stages it is required that at least 5 and 2 weight percent respectively of the total amount of polymer produced by the catalyst in the polymerization process be produced in each stage. It is preferred that at least 25 weight percent of the polymer be produced in a fast polymerization stage. If there is more than one slow and/or fast polymerization stage, the total amount of polymer produced in all of the fast and/or slow polymerization stages will be included in the minimum amounts to be produced in the fast and slow stages.

In one preferred process the first stage is a slow stage in which 2–15% by weight of total amount of polymer is produced, and the second stage is a fast stage in which the remainder of the polymer is produced. Stages in this context refers only to the amount of hydrogen present, if any.

General Polymerization Procedure in the Examples

The gas phase polymerization system used for this work was a semi-batch tank reactor. It consisted of a 2-L (9.9 cm I.D.×27.2 cm high) vertical stirred stainless steel reactor, gas purification systems, online mass flow rate detector to measure ethylene feed rate, and an online GC measurement system to analyze the gas phase composition in the reactor. The reactor was equipped with a double helical type agitator, and a jacket in which circulated a mixture of steam and water. The reactor could be operated in a temperature range of 10 to 130° C. by adjusting the steam and water flows in the jacket. Process temperature, pressure, and mass flow rate of reactants were measured and recorded online. Polymer grade ethylene monomer, ultra high purity nitrogen, and hydrogen were further purified by passing through their own series of two gas dryers, one carbon dioxide absorber, and one oxy-trap to remove residual impurities.

The following materials were used for the gas phase ethylene polymerizations:

Ethylene monomer (polymer grade, 99.9 mol %, Matheson Gas Products Canada, Inc., Whitby, Ontario, Canada);

Nitrogen (ultra high purity, 99.999 mol %, Praxair Canada, Inc., Belleville, Ontario, Canada);

Hydrogen (ultra high purity, 99.9999 mol %, Canadian Oxygen, LTD., Canox Div., Brockville, Ontario, Canada);

Toluene (99.9 wt %, anhydrous, Aldrich Chemical Co. Milwaukee, Wis., USA);

Sodium chloride powder (99.9 wt %, VWR CANLAB, Mount-Royal, Quebec, Canada);

Methylaluminoxane (10 wt % in toluene, Aldrich);

The nickel compound used in the catalyst system had the formula:

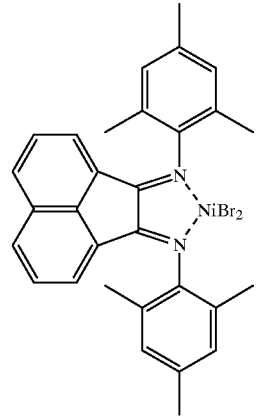

The following preparation steps were taken prior to polymerization:

Salt (NaCi) was dried at 200° C. in a vacuum oven for over 48 hours.

Toluene was distilled in the presence of metallic sodium and benzophenone.

Reactor body was dried at 130° C. for over one hour.

Unless otherwise noted, all pressure are gauge pressures.

The following procedures represent the operating steps for a typical gas phase ethylene polymerization experiment with salt (NaCl) as a "mixing medium" for the supported catalyst, since the small amounts of supported catalysts used can't be efficiently mixed alone:

An amount of pre-dried salt (400 g) was added into the reactor and the reactor system was sealed immediately. The reactor with salt was evacuated at 130° C. for at least one hour under vacuum and was then cooled down to 10° C. The reactor was pressurized to 69 kPa with purified nitrogen and was evacuated again. This operation step was repeated for three times. Then the reactor was purged using nitrogen (1.4 MPa) for 5 times. Methylaluminoxane (5 ml) for use as a scavenger was injected into the reactor and the contents in the reactor were mixed with an agitation speed of 200 RPM for 5 min.

Nickel compound supported on silica (50 mg including the weight of the silica and SMAO) with 5 ml of toluene was injected into the reactor. The silica supported nickel compound was made inside a dry box under nitrogen. The nickel compound (0.5 mmol) was dissolved in toluene, and then 10.0 g of silica supported MAO (the silica particles were approximately 55 μm in diameter) was added to the toluene solution. The silica supported MAO contained 14.3 weight percent of Al and was obtained from the Grace Division, Columbia, Md., U.S.A. The mixture was agitated for 60 min by a Vortexer®, then filtered. The solid was washed three time with toluene and twice with pentane, and then dried under vacuum. The dried catalyst was a dark black powder and the Al:Ni ratio was about 100:1. The nickel concentration was about 0.3 weight percent.

An additional 6 ml of toluene was used to wash down any catalyst residues in the catalyst charging port. The catalyst was mixed in the solid bed (salt) for 5 min under 280 kPa of nitrogen pressure. The reactor pressure was adjusted to 0 kPa by venting off the excessive nitrogen. Ethylene and hydrogen were charged into the reactor under agitation and the reactor temperature was raised to 50° C. within 3 to 10 min. The reactor pressure was adjusted with ethylene to 1.7 MPa using a regulator. Ethylene mass feed rate was recorded online. Temperature and pressure were maintained at a constant level for a given polymerization time (2 to 3 h), except as noted below.

If hydrogen had been added to the reactor, at some time during the polymerization (noted in Table 1) the reactor was vented to atmospheric pressure, then purged twice by pressurizing the reactor to 1.7 MPa with high purity nitrogen and then venting off the nitrogen, and then repressurized to 1.7 MPa with ethylene alone.

At the end of polymerization, the gas phase in the reactor was vented off after ethylene supply had been shut off. During the venting period, the reactor was cooled down to 10° C. by shutting off steam supply and increasing cooling water flow rate. The residual monomer in the reactor was removed under vacuum and the residual catalyst was deactivated by exposure to air. To ensure the removal of any residual toluene, the reactor was evacuated at 65° C. for 30 min.

After the reactor was cooled down, the mixture of salt and polymer powder was collected and weighed to determine amount of polymer produced. The salt was dissolved using deionized water and separated from polymer using a vacuum filter. The polyethylene powder was dried at 50° C. in a vacuum oven over night to remove any residual moisture.

Details of each example are given in Table 1. In Table 1 "Rate Increment 1" means the ratio of the rate of that Example at 40 min to the rate of Example 1 at 40 min. "Rate Increment 2" is ratio of the rate at 40 minutes for that Example compared to the rate at 10 minutes for that Example. PE is polyethylene.

TABLE 1

| Ex. | mol % $H_2$ | Vent Time (min) | Rate (10 min) kgPE/g Ni/h | Rate (40 min) kgPE/g Ni/h | Rate Increment 1 | Rate Increment 2 | Yield Polymer, g |
|---|---|---|---|---|---|---|---|
| 1 | 0 | — | 76 | 34 | 1.0 | 0.5 | 15.2 |
| 2 | 0.31 | 20 | 42 | 52 | 1.5 | 1.2 | 11.6 |
| 3 | 3.8 | 20 | 4.9 | 84 | 2.5 | 17.1 | 12.0 |
| 4 | 3.1 | 20 | 3.7 | 64 | 1.9 | 17.5 | 14.3 |
| 5 | 2.4 | 10 | — | — | — | — | 13.0 |
| 6 | 8.1 | 60 | — | — | — | — | 7.3 |

Figure 2:
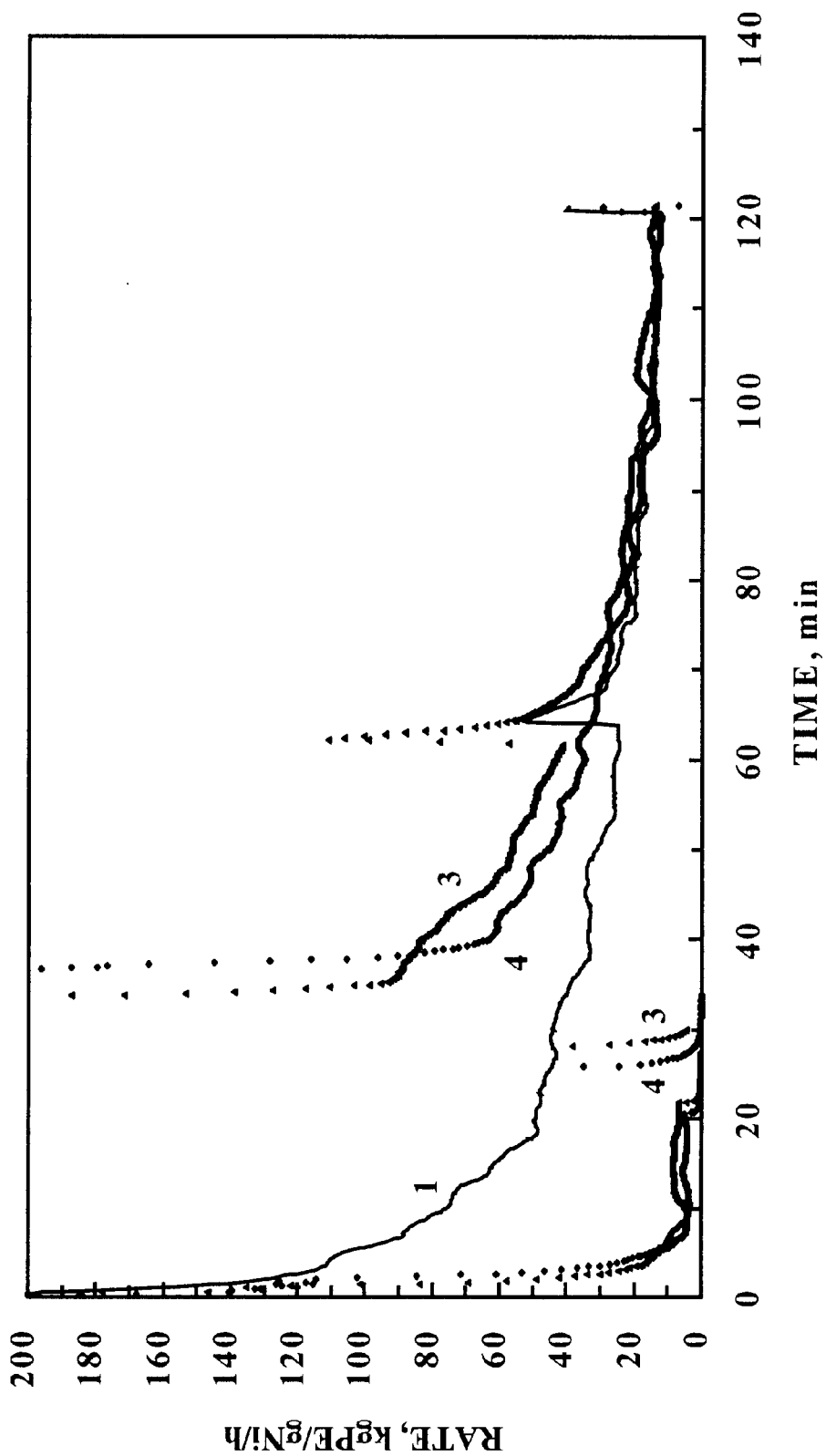
Figure 3:
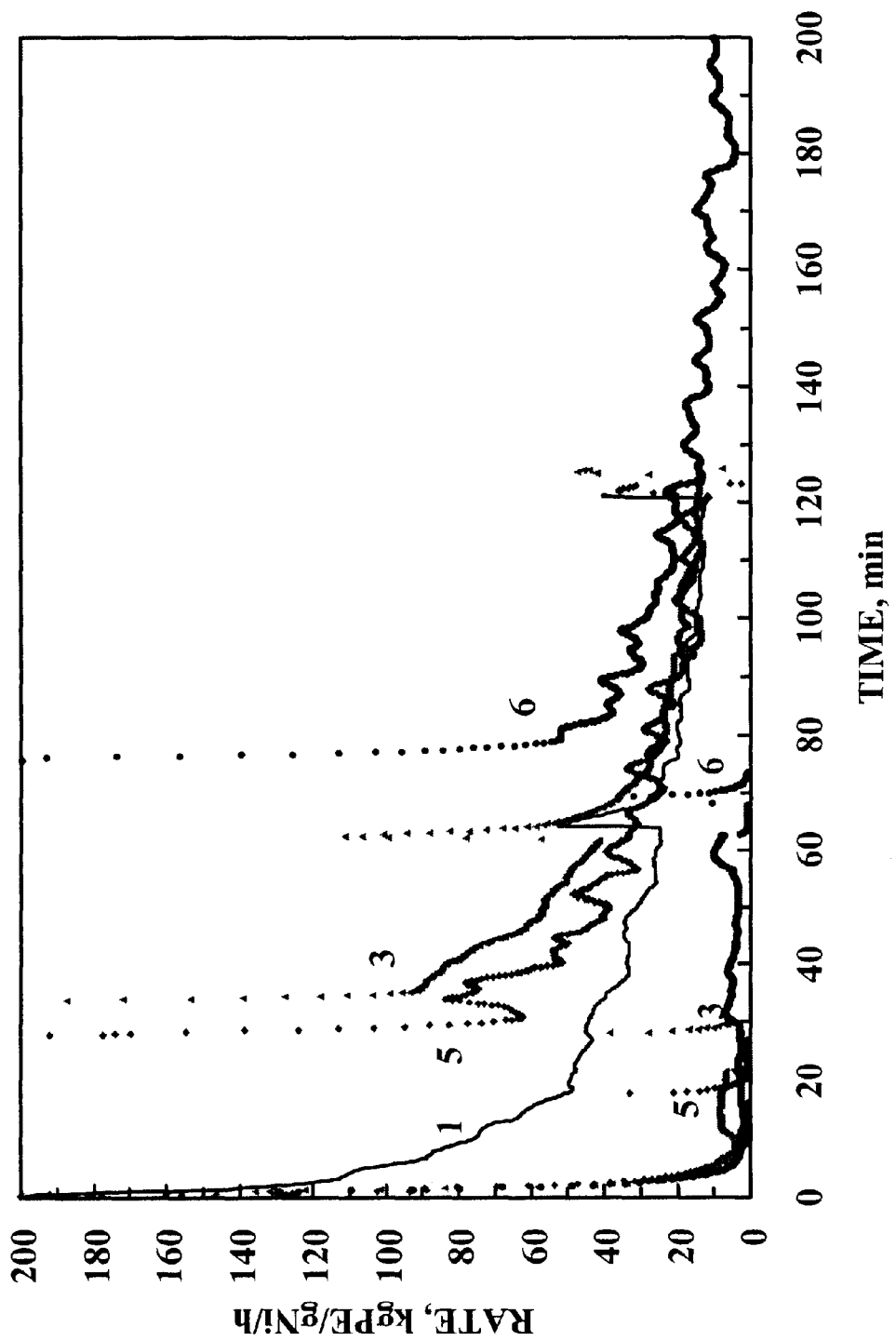

FIGS. 1, 2 and 3 show the rate of ethylene uptake versus time for the various Examples. The appropriate curves are labeled with the Example numbers. Some curves appear in more than one Figure for comparative purposes. The "spikes" and discontinuities in some of the curves are caused by sampling upsets or by venting and refilling of the reactor, usually to remove hydrogen, as described above. The data in Table 1 and as shown in the Figures clearly establishes that hydrogen slows the polymerization rate, but when the hydrogen is removed from the polymerization process the rate of polymerization becomes the same or even somewhat higher than the rate of polymerization if no hydrogen had been added at all, thereby surprisingly showing the effect of the hydrogen in slowing the polymerization rate is reversible.

What is claimed is:

1. An improved process for the polymerization of olefins using as part of a polymerization catalyst a coordination compound of a bidentate ligand containing a transition metal of Group 6 through Group 10, wherein the improvement comprises, carry out said polymerization in two or more stages at least one of which stages is a slow polymerization stage and one of which stages is a fast polymerization stage, and wherein:

in a slow polymerization stage at least 0.1 mole percent of hydrogen, based on the amount of monomer present, is present in said polymerization;

in a fast polymerization stage a level of hydrogen is present that is no more than 0.8 of a level of hydrogen present in said slow polymerization stage;

and provided that at least 5 percent by weight of a polymer produced in said process is produced in said fast polymerization stage, and at least 2 percent by weight of a polymer produced in said process is produced in said slow polymerization stage.

2. The process as recited in claim 1 wherein said transition metal is Fe, Co, Ni or Pd.

3. The process as recited in claim 1 wherein said coordination compound is a nickel compound.

4. The process as recited in claim 3 wherein said bidentate ligand is a neutral ligand.

5. The process as recited in claim 4 wherein said neutral ligand is

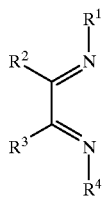 (I)

wherein $R^1$ and $R^4$ are each independently hydrocarbyl or substituted hydrocarbyl, and $R^2$ and $R^3$ are each independently hydrogen, hydrocarbyl or substituted hydrocarbyl, or $R^2$ and $R^3$ taken together may form a carbocyclic ring.

6. The process as recited in claim 3 wherein said bidentate ligand is a monoanionic ligand.

7. The process as recited in claim 1 wherein said slow polymerization stage 0.5 to 1.0 mol percent of hydrogen, based on the amount of monomer present, is present in said polymerization, and in said fast polymerization stage said level of hydrogen is present that is no more than 0.05 mol percent based on the amount of monomer present.

8. The process as recited in claim 1 wherein a first stage is said slow stage in which 2–15% by weight of total amount of polymer is produced, and a second stage is said fast stage in which the remainder of said polymer is produced.

9. The process as recited in claim 1 wherein said olefins comprise ethylene.

10. The process as recited in claim 1 carried out as a gas phase polymerization.

* * * * *